US011488788B2

(12) United States Patent
Zhi et al.

(10) Patent No.: US 11,488,788 B2
(45) Date of Patent: Nov. 1, 2022

(54) ELECTROLYTE FOR A SUPERCAPACITOR

(71) Applicant: City University of Hong Kong, Hong Kong (HK)

(72) Inventors: Chunyi Zhi, Hong Kong (HK); Zhaodong Huang, Hong Kong (HK); Xinliang Li, Hong Kong (HK); Guojin Liang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/502,061

(22) Filed: Oct. 15, 2021

(65) Prior Publication Data

US 2022/0139641 A1 May 5, 2022

Related U.S. Application Data

(60) Provisional application No. 63/108,926, filed on Nov. 3, 2020.

(51) Int. Cl.
*H01G 11/62* (2013.01)
*H01G 11/30* (2013.01)
(Continued)

(52) U.S. Cl.
CPC ............ *H01G 11/62* (2013.01); *H01G 11/30* (2013.01); *H01G 11/60* (2013.01); *H01G 11/52* (2013.01)

(58) Field of Classification Search
CPC ........ H01G 11/62; H01G 11/30; H01G 11/60; H01G 11/52
See application file for complete search history.

(56) References Cited

U.S. PATENT DOCUMENTS

2021/0218092 A1* 7/2021 Bodoardo ............. H01M 16/00

FOREIGN PATENT DOCUMENTS

CN 104779380 A * 7/2015
CN 111681886 A * 9/2020

OTHER PUBLICATIONS

Huang et al., Phosphorene as Cathode Material for High-Voltage, Anti-Self-Discharge Zinc Ion Hybrid Capacitors, May 2020, Adv. Energy Mater. 2020, 10, 20001024, pp. 1-10. (Year: 2020).*

(Continued)

*Primary Examiner* — Eric W Thomas
(74) *Attorney, Agent, or Firm* — Idea Intellectual Limited; Margaret A. Burke; Sam T. Yip

(57) ABSTRACT

The present invention provides a high output voltage supercapacitor having a cathode including layers of phosphorene, an anode comprising zinc, and an organic-solvent-based electrolyte including zinc. The supercapacitor demonstrates a high anti-self-discharge. The organic electrolyte may include an anhydrous zinc salt, tetraethylammonium tetrafluoroborate, and propylene carbonate ($Et_4NBF_4$/PC). The electrochemical stability window of $Et_4NBF_4$/PC extends beyond 2.5 V. The supercapacitor can be charged to 2.5 V and possesses high initial discharge voltage. The supercapacitor delivered 130 F $g^{-1}$ even after more than 9500 cycles at a current density of 0.5 A $g^{-1}$. More importantly, the supercapacitor exhibits a capacitance retention of 70.16% even after 500 hours self-discharge behavior.

11 Claims, 15 Drawing Sheets

(51) Int. Cl.
    H01G 11/60    (2013.01)
    H01G 11/52    (2013.01)

(56)            References Cited

OTHER PUBLICATIONS

X. Wang, T. S. Mathis, K. Li, Z. Lin, L. Vlcek, T. Torita, N. C. Osti, C. Hatter, P. Urbankowski, A. Sarycheva, M. Tyagi, E. Mamontov, P. Simon, Y. Gogotsi, Influences from solvents on charge storage in titanium carbide MXenes, Nat. Energy 2019, 4, 241-248.
Y. Yamada, J. Wang, S. Ko, E. Watanabe, A. Yamada, Advances and issues in developing salt-concentrated battery electrolytes, Nat. Energy 2019, 4, 269-280.
L. Suo, O. Borodin, T. Gao, M. Olguin, J. Ho, X. Fan, C. Luo, C. Wang, K. Xu, "Water-in-salt" electrolyte enables high-voltage aqueous lithium-ion chemistries, Science 2015, 350, 938-943.
H. Li, J. Lang, S. Lei, J. Chen, K. Wang, L. Liu, T. Zhang, W. Liu, X. Yan, A High-Performance Sodium-Ion Hybrid Capacitor Constructed by Metal-Organic Framework-Derived Anode and Cathode Materials, Adv. Funct. Mater. 2018, 1800757.
P. Ma, Y. Sun, X. Zhang, J. Chen, B. Yang, Q. Zhang, X. Gao, X. Yan, Spinel-type solar-thermal conversion coatings on supercapacitors: An effective strategy for capacitance recovery at low temperatures, Energy Storage Mater. 2019, 23, 159-167.

* cited by examiner

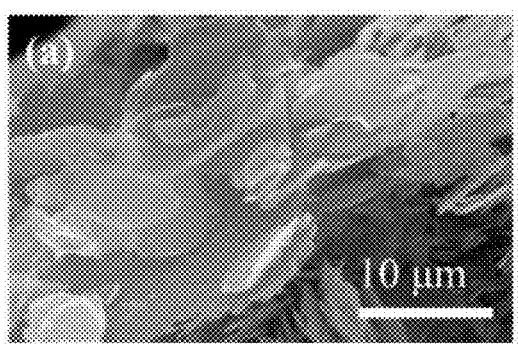
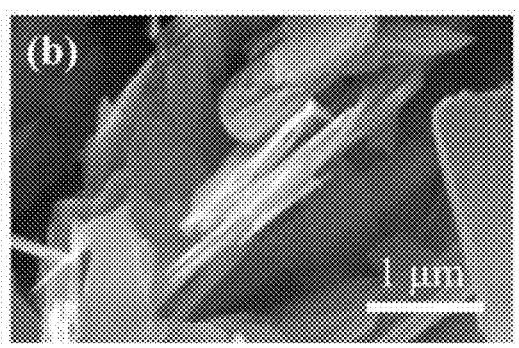
FIG. 1a　　　　　　　　FIG. 1b
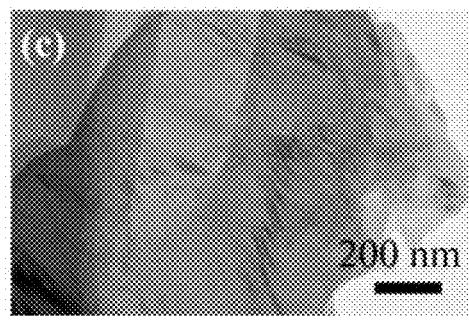
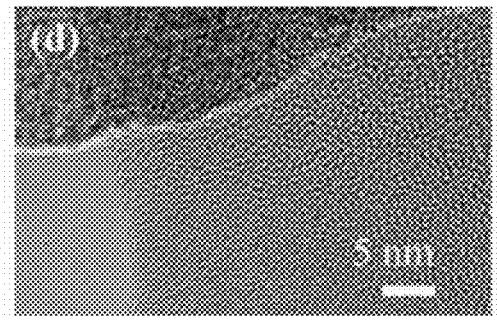
FIG. 1c　　　　　　　　FIG. 1d
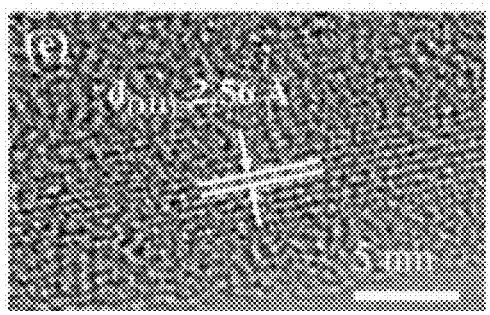
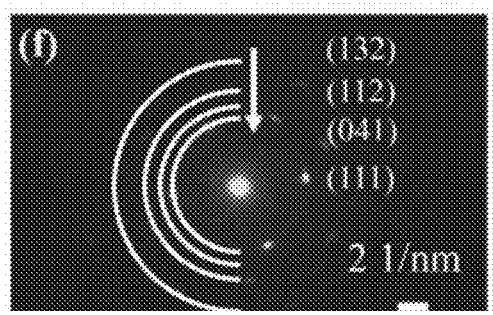
FIG. 1e　　　　　　　　FIG. 1f

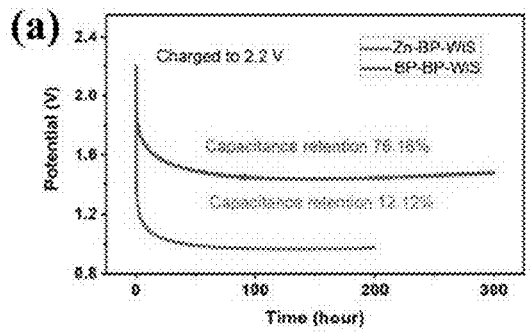
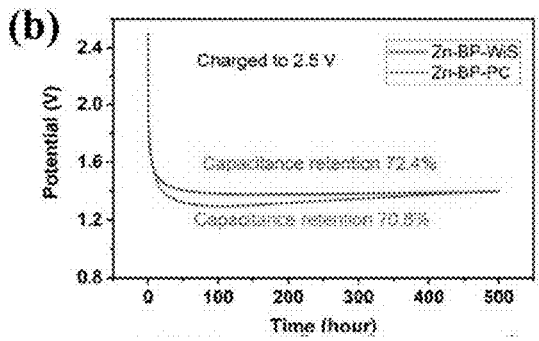
FIG. 4a	FIG. 4b
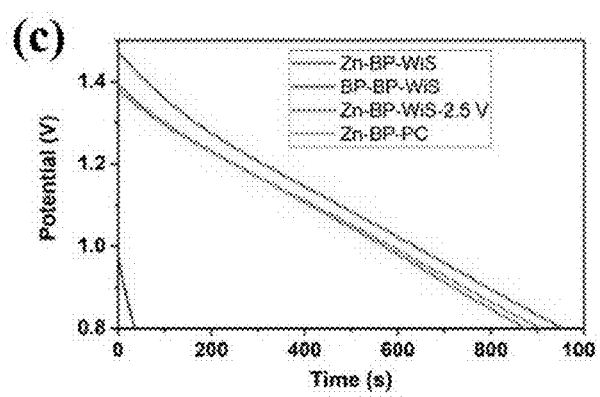
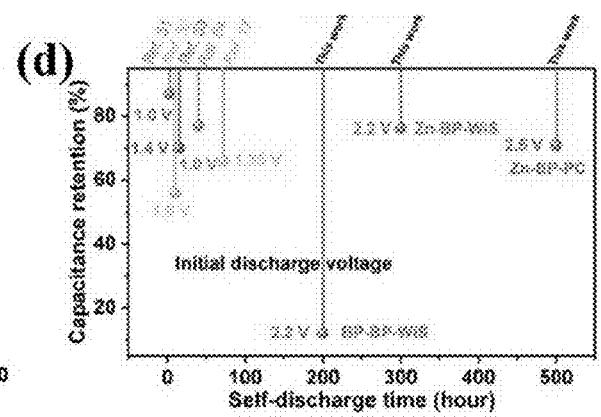
FIG. 4c	FIG. 4d

ELECTROLYTE FOR A SUPERCAPACITOR

FIELD OF THE INVENTION

The present invention relates to electrolytes in general and, more particularly, to energy storage apparatus such as capacitors, that include the electrolytes.

BACKGROUND

Supercapacitors are high-capacity capacitors in which conductive plates are immersed in an electrolyte and are separated by a thin insulator. A double layer of electric charge is created in the supercapacitor as opposite charges are formed on both sides of the thin insulator when the plates are charged. As a result, supercapacitors exhibit higher power densities than ordinary capacitors and can be used for energy storage, in a similar manner to batteries. However, unlike batteries, supercapacitors have unlimited life cycles, and can be charged and discharged an unlimited number of cycles.

It is generally believed that supercapacitors are characterized by high power density and low energy density; therefore, significant efforts have been focused on improving the energy density of electrode materials.

Output voltage and anti-self-discharge ability are two important performance indices of supercapacitors which have long been ignored; however, these properties play a very significant role in the practical application of supercapacitors. In general, the potential windows of aqueous supercapacitors are lower than 1.5 V and are limited by the electrochemical stability window of water (1.23 V); this level is far from meeting the needs of current energy storage systems and electronic devices. Two methods that have proven effective in resolving the narrow voltage range that results from water decomposition entail replacing the water electrolyte with 'water-in-salt' (WiS) electrolytes and organic electrolytes, respectively. The WiS electrolyte use expands the potential window to approximately 3.0 V due to the formation of an electrode-electrolyte interphase. The close interaction between water molecules and the electrolyte in ultrahigh concentration makes it difficult for water to decompose, thus effectively broadening the electrochemical operating voltage range. As for organic electrolytes, the influence of water electrolysis is exclusive, and the electrolyte operating voltage range only depends on its electrochemical stability voltage. Further, organic electrolytes are less expensive than water-in-salt electrolytes Although the use of such electrolytes expands the potential windows for supercapacitors, current organic solvent-based electrolyte systems are insufficient for practical use of supercapacitors. Further, the energy density of supercapacitors is lower than batteries and requires improvement for large-scale industrial use. Thus, there is a need in the art for improved electrolyte systems for supercapacitors and improved supercapacitor electrode structures; such improvements would lead to extended use of supercapacitors in commercial environments.

SUMMARY OF THE INVENTION

The invention provides a high output voltage supercapacitor with outstanding energy density as well as excellent anti-self-discharge property by using an organic electrolyte system. The organic electrolyte includes $ZnCl_2$, tetraethylammonium tetrafluoroborate, and propylene carbonate ($Et_4NBF_4$/PC). The electrochemical stability window of $Et_4NBF_4$/PC extends beyond 2.5 V. Few-layer phosphorene (FL-P) and zinc are adopted as cathode and anode materials, respectively. A Zn-BP-PC capacitor can be charged to 2.5 V and possess high initial discharge voltage. FL-P based zinc ion capacitor with $Et_4NBF_4$/PC as electrolyte (Zn-BP-PC) delivered 130 F $g^{-1}$ even after more than 9500 cycles at a current density of 0.5 A $g^{-1}$. More importantly, Zn-BP-PC exhibits a capacitance retention of 70.16% even after 500 hours self-discharge behavior.

In one aspect, the present invention provides a high output voltage supercapacitor having a cathode including layers of phosphorene, an anode comprising zinc, and an organic-solvent-based electrolyte including zinc. The organic electrolyte may include an anhydrous zinc salt, tetraethylammonium tetrafluoroborate, and propylene carbonate ($Et_4NBF_4$/PC).

BRIEF DESCRIPTION OF THE DRAWINGS

FIG. 1a-1d are images of FL-P. FIGS. 1a-1b are SEM images of FL-P while FIGS. 1c-1f are TEM, HRTEM and corresponding SAED images of FL-P.

FIG. 2a is three-electrode CV curves of BP electrode. FIGS. 2b, 2c are CV curves of BP-BP-WiS and Zn-BP-WiS, respectively. FIGS. 2d-2f are cycling performance, rate properties and GCD curves at different rates of BP-BP-WiS. FIGS. 2g-2i are cycling performance, rate properties and GCD curves at different rates of Zn-BP-WiS.

FIGS. 3a-3c show the cycling performance, rate properties, and GCD curves at different rates of BP-BP-PC. FIGS. 3e-3f show the cycling performance, rate properties, GCD curves at different rates for Zn-BP-PC. FIG. 3g is a comparison of specific capacitances of Zn-BP-WiS, Zn-BP-PC, BP-BP-WiS and BP-BP-PC at different current densities. FIG. 3h is a comparison of voltage ranges in different electrolytes. FIG. 3i is the Ragon plot comparison among different supercapacitors and Zn-BP-WiS, Zn-BP-PC.

FIGS. 4a-4l show electrochemical properties of supercapacitors. FIG. 4a shows self-discharge curves of Zn-BP-WiS and BP-BP-WiS within the potential windows of 0.8-2.2 V. FIG. 4b shows self-discharge curves of Zn-BP-PC and Zn-BP-WiS within the potential windows of 0.8-2.5 V. FIG. 4c shows the discharge curves after the self-discharge test in FIGS. 4a and 4b; FIG. 4d shows the capacitance retention and initial discharge voltage comparison of different supercapacitors and ion hybrid capacitor systems. FIGS. 4e and 4f are Raman mappings of FL-P in charged state with Raman shift in $Ag^{-1}$ and $B_{2g}$ region, respectively. FIGS. 4g and 4h are Raman mappings of FL-P in discharged state with Raman shift in $Ag^{-1}$ and $B_{2g}$ region, respectively. FIGS. 4i and 4l are schematic diagrams of an FL-P based symmetric supercapacitor and a zinc ion hybrid capacitor in the charged state.

FIG. 5a is a schematic diagram of an electrode materials printing process. FIG. 5b shows the cycling stability of Zn-BP-WiS at a current density of 0.5 A $g^{-1}$. FIG. 5c shows the GCD curves of Zn-BP-WiS at different current densities. FIGS. 5d and 5e are spiral pattern and taichi pattern printed capacitors as the power source of an electronic watch. FIG. 5f is a schematic diagram of the electrode and ion pathway structures.

FIG. 12a is step 1-printed conductive substrate, FIG. 12b is step 2-printed cathode materials. FIG. 12c is step 3-printed anode materials.

DETAILED DESCRIPTION

The present invention provides supercapacitors with improved anti-self-discharge properties as the low capacity retention in an open circuit state makes supercapacitors less effective in practical applications. A general approach was required to enhance the anti-self-discharge properties. The intrinsic reason for the fast-self-discharge speed is that when both the anode and cathode materials store electricity through adsorption behaviors, they have a barely satisfactory ion limiting ability and the ions adsorbed on the electrode during the charging process will soon diffuse into the electrolyte due to the concentration gradient. Hybrid ion capacitors can be constructed to inhibit self-discharge by incorporating insertion-type and conversion-type battery-type electrodes that have stronger force for limiting ions than through simple adsorption behaviors.

Figure 6:
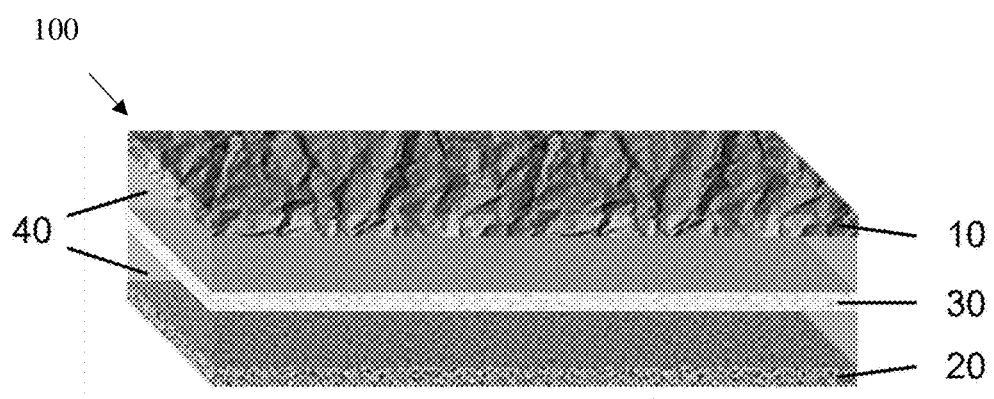
FIG. 6 is a schematic diagram of a supercapacitor according to an embodiment.

Turning to the drawings in detail, FIG. 6 depicts a supercapacitor 100 according to an embodiment of the present invention. The supercapacitor includes a cathode 10 and an anode 20 formed as parallel plates that are separated by an insulator 30. An electrolyte 40 contacts the cathode 10, the anode 20, and the insulator 30.

In the supercapacitor of FIG. 1, a conventional electrode is replaced with a conversion-type electrode material such as zinc anode 20, which will not transform spontaneously in the open state. Without the formation of a closed circuit, the self-discharge capacity of the whole supercapacitor is reduced since the self-diffusion of ions that occurs due to the difference in concentration of the adsorption-type electrodes is inhibited. The self-diffusing ions are fixed on the electrode, thus effectively improving the capacity retention rate of the whole supercapacitor. Because of the required activation energy, zinc does not readily convert into zinc ions since it requires sufficient external energy. Hence, the ions are firmly adsorbed on the cathode materials and are difficult to diffuse into the electrolyte without the formation of an electronic circuit, which greatly improves the anti-self-discharge property of the inventive zinc ion capacitor. Thus, the introduction of a conversion-type zinc anode 20 can effectively improve the energy density of the supercapacitor. The zinc anode may be a sheet of zinc or a layer of zinc metal deposited on a conductive collector.

For the cathode, few-layer two-dimensional materials are selected. Few-layer two-dimensional materials have the characteristics of supercapacitor-type materials because of their large specific surface area and abundant adsorption sites. Few-layer phosphorene (FL-P) has a large specific surface area, durable mechanical strength (approximately 94 GPa), and high carrier mobility (approximately 10 000 $cm^2V^{-1}\ s^{-1}$), which are beneficial properties for both energy storage and conversion applications such as in lithium and sodium-ion batteries as well as in optoelectronic devices. Therefore, the cathode 10 is selected to be few-layer phosphorene (FL-P). Few-layered phosphorene is isolated through exfoliation from black phosphorus. Compared to FL-P based symmetric supercapacitors (that is, supercapacitors which use FL-P in both the anode and the cathode), the use of an FL-P cathode coupled with a zinc anode can significantly improve the anti-self-discharge property, since a zinc anode prevents ions adsorbed on the FL-P cathode from self-diffusing.

The most widely adopted methods for the procurement of FL-P have been the liquid exfoliation and the electrochemical exfoliation methods. The liquid exfoliation method is a simple and effective method for peeling black phosphorus, while its ultra-long sonication process (over 10 h) unavoidably decreases the flake size of FL-P to smaller than a few hundred nanometers and causes extensive defects. The electrochemical exfoliation method entails anionic and cationic intercalations. The anionic intercalation approach utilizing sulfonate nitrate salts as intercalation ions can lead to partial oxidation of 2D materials due to the formation of $SO_2$ and NO from the decomposition of the insertion ions. Cationic insertions without oxidizing conditions would not result in modification of oxygen functional groups. Large-area, thinner FL-P with fewer defects can be obtained through the electrochemical cationic exfoliation method. In the present invention, FL-P was exfoliated through the electrochemical exfoliation of black phosphorus (BP) and the as-prepared FL-P was utilized as a cathode material 10.

Compared to the liquid exfoliation method, electrochemical exfoliation could effectively prepare large-area, layer-tunable FL-P in a short time.

The morphology and structure of as-obtained FL-P were elucidated by scanning electron microscopy (SEM, FIGS. 1a and 1b) and transmission electron microscopy (TEM, FIGS. 1c, 1d). A curly ultrathin nanoflake structure was shown in SEM patterns of FL-P at various magnifications, in which numerous nanosheets were stacked together to from a three-dimensional framework. FIGS. 1c, 1d exhibited the representative TEM images, displaying the few-layer structure of FL-P, which demonstrated successful delamination through the electrochemical exfoliation method. High-resolution transmission electron microscopy (HR-TEM) and corresponding selected area electron diffraction (SAED) are shown in FIG. 1e, if, from which the lattice spacing of the (111) lattice plane was 2.56 Å in polycrystalline was observed, as well as in different lattice planes of FL-P.

The organic electrolyte 40 according to the present invention is an organic electrolyte. According to the present invention, it was determined that the addition of zinc to an organic electrolyte can increase the voltage of the supercapacitor. Compared with pure pseudocapacitive materials, zinc metal possesses a clear redox potential of −0.76 V vs. standard hydrogen electrode (SHE) and can provide a stable voltage output, which could improve the output specific energy of supercapacitor. The solvents for organic electrolytes could be various esters and ethers, such as dimethyl carbonate, ethylene carbonate, dimethyl ether. An exemplary organic electrolyte system is tetraethylammonium tetrafluoroborate in propylene carbonate ($Et_4NBF_4$/PC), however, other organic electrolytes may also be used. Zinc may be added in the form of an anhydrous zinc salt such as zinc chloride, zinc trifluoromethylsulfonate, zinc di[bis(trifluoromethylsulfonyl)imide]. The amount of zinc added may range from 0.1 M to 1.0 M; in one embodiment, 0.2 M $ZnCl_2$ is used. Although the electrolytes find particular use as electrolyte 40 in supercapacitor 100, the electrolytes of the present invention may be applied to other supercapacitor structures such as aqueous carbonaceous-based pseudocapacitance symmetric supercapacitors since the narrow electrochemical stability window aqueous electrolyte was severely limited by hydrogen evolution reaction and oxygen evolution reaction; the electrolytes of the present invention possess a much wider operating voltage range.

EXAMPLES

Preparation of FL-P for cathode: Black phosphorus (BP) crystals were purchased from XF NANO (>99.998%). Tetrabutylammonium hexafluorophosphate (TBAP, >99%) and DMF (anhydrous, amine free, 99.9%) were purchased from Alfa-Aesar. All chemicals were used without any purification. FL-P was prepared through electrochemical exfoliation method as previous reported. Typically, BP was utilized as cathode and a Pt sheet was employed as counter electrode. The electrolyte was prepared by dispersing TBAP (5.8 g) in DMF (30 ml). Static potential of −5 V 18 was applied to BP electrode through a direct-current electrical source (LW10J2, Shanghai Liyou Electric Co., Ltd.). After 30 minutes exfoliation, the resultants were washed with DMF and ethanol for several times, followed by drying in a vacuum oven at 80° C. for 12 hours. The products are FL-P.

Preparation of Electrolyte

The organic electrolyte of the present invention was prepared along with a water-in-salt (WiS) electrolyte for comparison to the inventive electrolyte. $LiN(SO_2CF_3)_2$ (LiTFSI), $Zn(CF_3SO_3)_2$, N, N'-methylenebisacrylamide and zinc chloride ($ZnCl_2$) were purchased from Aladdin Reagent and used without any purification. The WiS was prepared by dissolving 21M LiTFSI and 1M $Zn(CF_3SO_3)_2$ into deionized (DI) water. Typically, 12.058 g LiTFSI and 0.728 g $Zn(CF_3SO_3)_2$ were dissolved into 2 ml DI water followed by vigorously stirring for more than 12 hours at 45° C.

The solvent of tetraethylammonium tetrafluoroborate in PC ($Et_4NBF_4$/PC) was purchased in Cyber Electrochemical Materials. The organic electrolyte of the present invention was prepared by adding 0.2 M $ZnCl_2$ into $Et_4NBF_4$/PC solvent. Specifically, 2.726 g $ZnCl_2$ was dissolved in 100 ml $Et_4NBF_4$/PC solvent.

The hydrogel polyelectrolyte was prepared by polymerization of acrylamide in WiS electrolyte. 220 mg of acrylamide, 2.67 mg of ammonium persulfate and 0.087 mg N, N'-methylenebisacrylamide were added into the as-prepared WiS electrolyte (1 ml) and stirred for 2 h at room temperature, yielding a uniform liquid precursor. Then the mixture solution was injected into a glass mold and solidified to form the hydrogel film at 70° C. for 1.5 h.

Characterization The morphology and structure of FL-P were investigated by field emission scanning electron microscope (SEM; S-4700, Hitachi) and transmission electron microscopy (TEM; JEOL-2001F). Raman spectra and Raman mapping measurement were obtained by a Raman spectroscopy (WITec alpha300 access) with a laser of 532 nm wavelength and a grating of 600 g mm−1.

Preparation of Electrodes

The cathode materials were prepared by mixing FL-P, Ketjenblack and polyvinylidene fluoride (PVDF; AR grade, Aladdin) in a mass ratio of 7:2:1. The obtained mixture was dispersed in certain amount of N-methyl-2-pyrrolidone (NMP; AR grade, Aladdin) solvent and stirred for 30 minutes to form uniform slurry, followed by coating on carbon cloth and drying in a vacuum oven at 80° C. for 12 hours. The mass loading of FL-P is approximately 0.6-0.8 mg per square centimeter.

Zinc plate (100 μm) served as anode materials directly.

Electrochemical Measurements

The electrochemical performances were tested through a coin cell system with a cellulose nonwoven film as the separator. The electrochemical performance of four kinds of supercapacitors including BP-BP-WiS, Zn-BP-WiS, and BP-BP-PC (comparison cells) and Zn-BP-PC (inventive cell) have been tested through more than five cells. The electrochemical performance including CV, cycling stability, rate capabilities are the results of normalization, which have taken the effects of error into account. The cyclic voltammetry curves were performed by a multichannel electrochemical workstation (CHI 760D) and galvanostatic charge and discharge (GCD) curves were obtained by Autolab PGSTAT101.

Electrochemical measurements of cycling and rate properties were performed by and a LAND CT2001A battery testing device. Specific capacitances of capacitors were calculated from GCD curves through the equation below:

$$C = \frac{I \times \Delta t}{\Delta V \times m}$$

where C (F g$^{-1}$) is the mass specific capacitance of the capacitor, I (A) is discharging current, Δt (s) is discharging time, ΔV (V) is difference of potential window (equal to voltage upper limit minus voltage lower limit) and m (g) is the mass of active materials.

The energy density and power density of FL-P-based zinc ion capacitor can be further calculated from GCD curves at different current density utilizing following equations:

$$E = \frac{1}{2*3.6}C(\Delta V)^2$$

$$P = \frac{E*3600}{t}$$

Where E (Wh kg$^{-1}$) is the energy density of the capacitor, P W(kg$^{-1}$) is the power density of the capacitor, and t (s) is the discharge time of the GCD curves.

Results:

Electrochemical Properties of the FL-P Cathode Materials

Figure 2A:
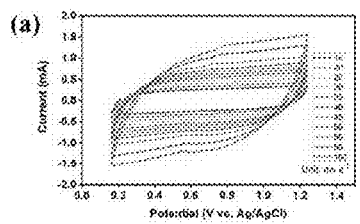
FIGS. 2a-2i depict the electrochemical performance of FL-P-based symmetric supercapacitor (comparison) and a zinc ion hybrid capacitor in WiS electrolyte.
Figure 2B:
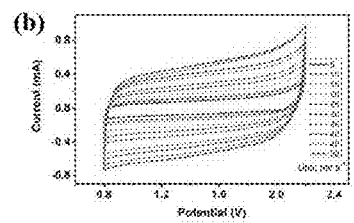

A three-electrode system was used to measure the electrochemical properties of the FL-P cathode materials. The introduction of a reference electrode may stabilize the potential of the working electrode, thus effective eliminating the electrode potential deviation caused by polarization current. The three-electrode CV curves of FL-P at various scan rates with platinum plate and Ag/AgCl as counter and reference W(kg) electrodes, respectively, are shown in FIG. 2a. The ellipsoidal curves portray FL-P energy storage in the WiS system through electric double-layer adsorption and pseudocapacitance behaviors. The CV curves showed slight deviations as the scan rate increased from 15 to 100 mvs$^{-1}$; this indicates that the mechanisms of capacitance contribution have changed with amplified scan rate. This may be attributed to the influence of diffusion-controlled ionic transport process. In order to improve the output voltage, the lower limit of potential range was set to 0.8 V. The CV curves of BP-BP-WiS (comparative example) are shown in FIG. 2b, in which no evident distortion was observed as the scan rate increased from 5 to 50 mvs$^{-1}$, signifying low resistance and expected superior rate performance of BP-BP-WiS.

The initial discharge voltage was over 2.0 V demonstrating that WiS electrolyte could expand the operating potential of the aqueous energy storage system.

Figure 7:
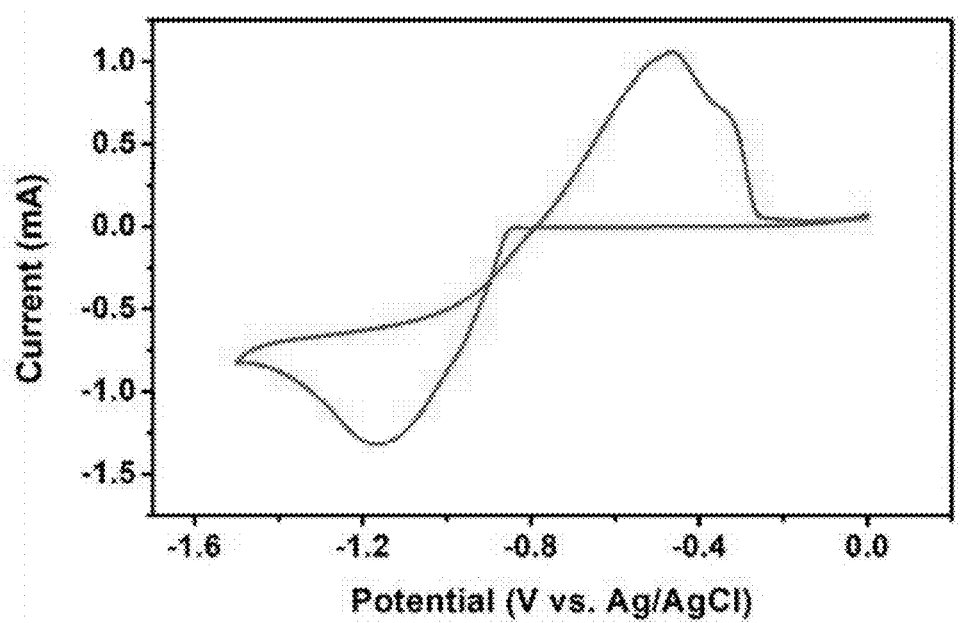
FIG. 7 is a three electrode CV curve of a zinc electrode in WiS electrolyte.

FIG. 7 was the three-electrode CV curve of a zinc electrode, demonstrating that the conversion reaction between Zn and $Zn^{2+}$ can progress smoothly and reversibly within the working voltage range. Besides, aqueous zinc-based energy storage techniques have many merits such as low cost, environmentally friendly and abundant reserves.

Figure 2C:
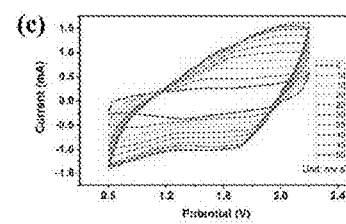
Figure 2D:
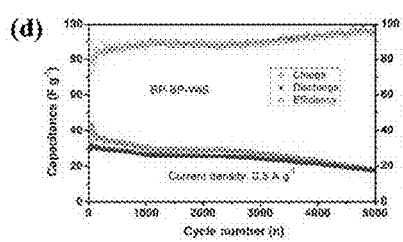
Figure 2E:
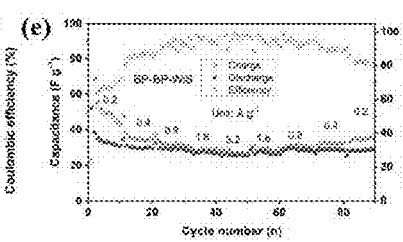
Figure 2F:
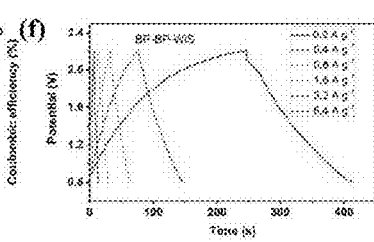

FIG. 2c displays the CV curves of Zn-BP-WiS (comparative example) capacitor, which are characterized by different shapes in comparison to that of BP-BP-WiS. The rectangular CV curves of BP-BP-WiS (comparative example) were due to the weak pseudocapacitance behavior of the FL-P-based supercapacitor. The capacitance of Zn-BP-WiS on the other hand, was mainly a result of pseudocapacitance behavior after the introduction of zinc anode. Their CV curves gradually deviate from the first CV curve with the scan rate increased from 5 to 50 mvs$^{-1}$ as a result of the increasing pseudocapacitance-generated capacity. The electrochemical performance of BP-BP-WiS is shown in FIGS. 2d-2f. The potential range has been expanded to 2.2 V due to the utilization of WiS electrolyte, which results in a much higher capacitance than other aqueous supercapacitors. However, BP-BP-WiS capacitor only retained 18 Fg$^{-1}$ after 5000 cycles at a current density of 0.5 A g$^{-1}$ as shown in FIG. 2d. The specific capacitances were calculated based on the mass of active materials.

Figure 2G:
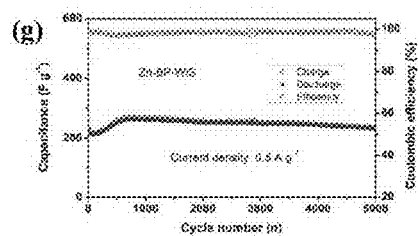

BP-BP-WiS capacitor showed inferior rate properties as displayed in FIG. 2e and delivered 49.2, 34.6, 31.5, 28.6, and 27.2 Fg$^{-1}$ at current densities of 0.2, 0.4, 0.8, 1.6, and 3.2 Ag$^{-1}$, respectively. The coulombic efficiencies of initial dozen cycles were relatively low, which can be attributed to the impeding effect of the self-discharge behavior on charging in the high voltage range. The low efficiencies are especially severe at low current densities, which can also be demonstrated on the galvanostatic charge and discharge (GCD) curves. The GCD curves of BP-BP-WiS are exhibited in FIG. 2f; the charging curve with low current density (especially 0.2 A g$^{-1}$) has a lower slope in the high voltage region, which is consistent with the inferior coulombic efficiency of BP-BP-WiS in FIG. 2g. It is observed that there are only adsorption and desorption behaviors during the charging and discharging processes within the potential range of 0.8 V to 2.2 V as shown in the CV curves of BP-BP-WiS in FIG. 2b.

The low coulombic efficiency of BP-BP-WiS results from the severe self-discharge behaviors in the high-voltage part of charging process. Specifically, the self-discharge behavior is very serious in the high-voltage part of the charging process due to the large voltage and concentration difference between the electrode and electrolyte. It therefore requires more energy to charge to a certain voltage. Through the study of the electrochemical properties of BP-BP-WiS, it has been shown that the WiS electrolyte expands the water electrolysis potential but has no obvious effect on improving the energy density of the supercapacitor system.

Figure 2H:
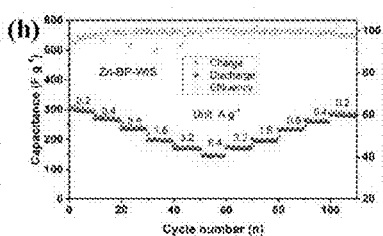
Figure 2I:
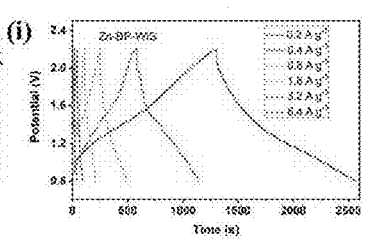

FIG. 2c demonstrates that a zinc anode and FL-P cathode can create a zinc ion capacitor in a WiS electrolyte (comparative example) within the potential window between 0.8 V and 2.2 V. The cycling stability, rate properties and GCD curves of Zn-BP-WiS have been illustrated in FIGS. 2g-2i. Zn-BP-WiS capacitors delivered excellent cycling stability (FIG. 2g), retaining approximately 238.7 Fg$^{-1}$ of capacitance without apparent attenuation even after 5000 cycles at a current density of 0.5 Ag$^{-1}$, which was much better than that of BP-BP-WiS due to the additional pseudocapacitance behavior resulting from the introduction of the zinc anode. The Zn-BP-WiS capacitor also exhibited outstanding rate capabilities which delivered capacitances of 304, 271.4, 236.2, 200.0, 174.3, 145.9 Fg$^{-1}$ at current densities of 0.2, 0.4, 0.8, 1.6, 3.2, 6.4 Ag$^{-1}$, respectively; when the current densities gradually decreased to 0.2 Ag$^{-1}$, the capacitances returned to original values.

Figure 8:
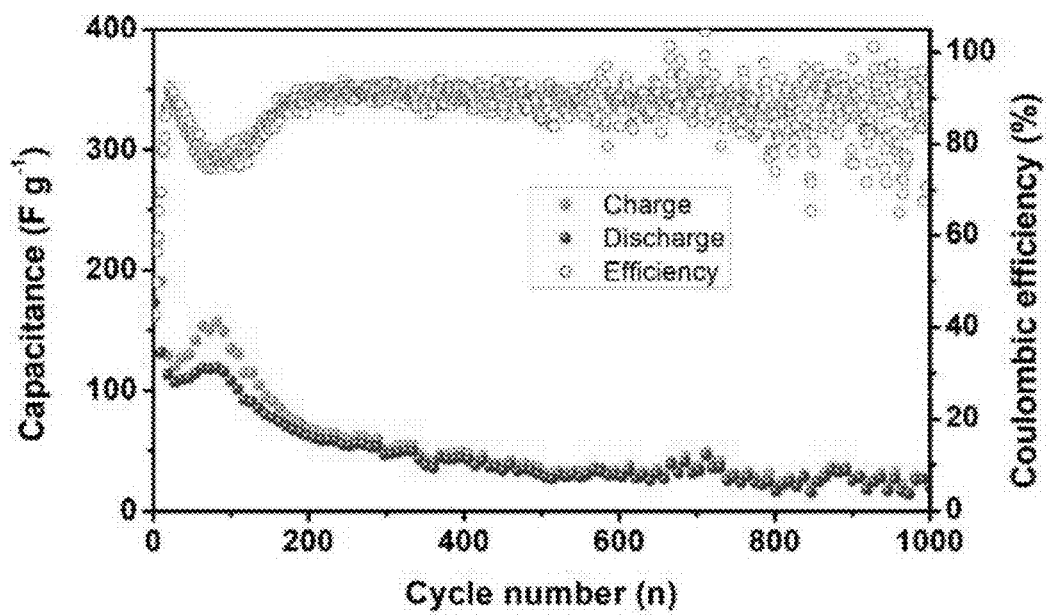
FIG. 8 is the cycling performance of FL-P-based zinc ion capacitor with pure 21 M LiTFSI as electrolyte.

The rate performances of Zn-BP-WiS can be ascribed to the superior electron conductivity of FL-P and reversibility of the conversion reaction between Zn and $Zn^{2+}$ on the zinc anode. Specifically, FIG. 2i displayed the GCD curves of Zn-BP-WiS, which exhibited slightly different characteristics from those of BP-BP-WiS. The GCD curves of Zn-BP-WiS had similar shapes at different current densities and possessed a slope platform at around 1.6 V matching with the broad peak of the CV pattern in FIG. 2c, which corresponds to the potential of pseudocapacitance behavior. The electrochemical performance of FL-P-based zinc ion capacitor with pure 21 M LiTFSI as an electrolyte was characterized by poorer capacity and cycling stability than that of Zn-BP-WiS, the results are shown in FIG. 8. FIG. 8 demonstrates that zinc ions dominate the pseudocapacitance behavior of Zn-BP-WiS.

The use of WiS electrolyte expands the potential window of aqueous zinc ion capacitor and the ceiling of the working potential window has been successfully elevated to 2.2 V. However, The BP-BP-WiS showed unsatisfactory capacitance due to its intrinsic shortcomings. Utilizing the zinc anode to construct an ion hybrid capacitor was used as the measure to obtain a zinc ion capacitor with high voltage as well as outstanding specific capacitance.

The electrochemical performance of FL-P-based symmetric supercapacitor (comparative example) and zinc ion capacitor (invention) with an organic solvent as the electrolyte was examined. The organic electrolyte was prepared by adding 0.2 M $ZnCl_2$ into $Et_4NBF_4$/PC solvent. The electrochemical properties of BP-BP-PC (comparison) and Zn-BP-PC (invention) are depicted in FIGS. 3a-3c and FIGS. 3d-3f, respectively. The operating potential windows of the $Et_4NBF_4$/PC electrolyte system were even higher than that of the WiS electrolyte system with the upper limit of the potential window reaching 2.5 V, showcasing the admirable electrochemical stability of the PC solvent.

Figure 3A:
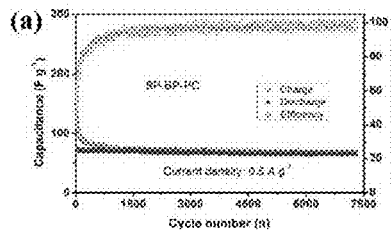
FIGS. 3a-3i depicts the electrochemical performance of FL-P-based symmetric supercapacitors (comparison) and zinc ion hybrid capacitor in $Et_4NBF_4$/PC electrolyte according to the present invention.
Figure 3B:
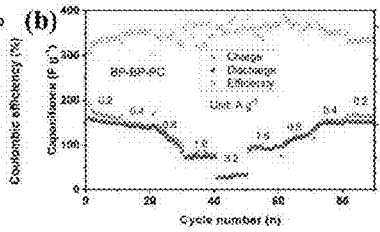
Figure 3C:
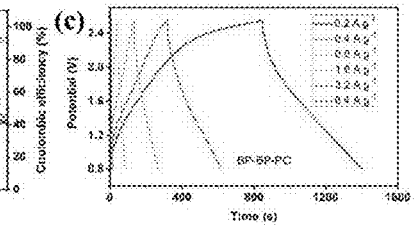
Figure 3D:
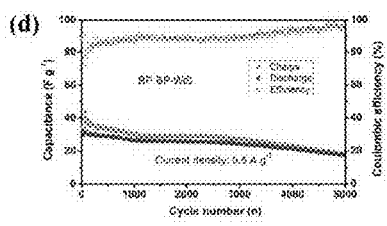
Figure 3E:
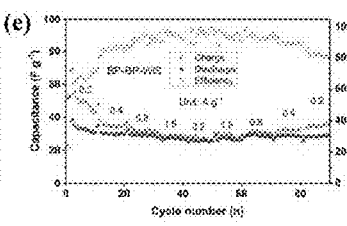
Figure 3F:
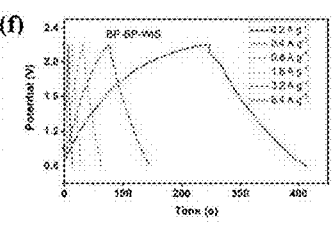
Figure 3G:
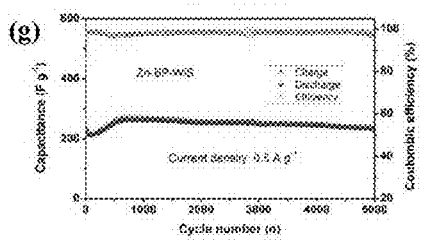

The cycling performance of BP-BP-PC and Zn-BP-PC are shown in FIG. 3a and FIG. 3d, in which the former delivered 74.1 Fg$^{-1}$ after more than 7300 cycles at a current density of 0.5 Ag$^{-1}$, while the latter exhibited 130 F g$^{-1}$ even after more than 9500 cycles at a current density of 0.5 A g$^{-1}$. The rate capabilities and corresponding GCD curves of BP-BP-PC (FIGS. 3b, 3c) and Zn-BP-PC (FIGS. 3e, 3f) have also been demonstrated. BP-BP-PC exhibited 166.3, 147.1, 127.9, 82.6, and 26.9 Fg$^{-1}$ at current densities of 0.2, 0.4, 0.8, 1.6, 3.2 Ag$^{-1}$, respectively. Their cycling stability and capacitance demonstrate an advantage over that of BP-BP-WiS, which was attributed to the superior chemical stability of FL-P in PC solvent and their extended operating voltage window. Zn-BP-PC (invention) delivered 363.9, 308.8. 247.4, 160.2, 80.2, and 46.1 Fg$^{-1}$ at current densities of 0.2, 0.4, 0.8, 1.6, 3.2, and 6.4 Ag$^{-1}$, respectively. This was much better than that of BP-BP-PC due to the introduction of zinc anode. The cycling stability and rate capability of Zn-BP-PC appeared to be slightly inferior than those of Zn-BP-WiS, which may be attributed to the lower ion conductivity of the $ZnCl_2/Et_4NBF_4/PC$ electrolyte relative to that of the WiS electrolyte. The GCD curves of BP-BP-PC and Zn-BP-PC are shown in FIGS. 3c and 3f and are similar in shape to those of BP-BP-WiS and Zn-BP-WiS. The rate performance of the FL-P-based symmetric supercapacitor and the zinc ion capacitor in both WiS and $Et_4NBF_4$/PC electrolytes are compared in FIG. 3g. The zinc ion capacitor of the present invention displayed enhanced performance compared to the symmetric supercapacitor in both electrolytes.

Both WiS and $Et_4NBF_4$ electrolytes effectively expanded the operating potential of the FL-P based supercapacitor. The zinc ion capacitor with WiS electrolyte provided a more stable cycling performance and excellent rate capabilities as compared to those of the $Et_4NBF_4$/PC electrolyte. However, compared to the expensive WiS electrolyte, the low cost $Et_4NBF_4$/PC electrolyte provides an even higher upper limit voltage (2.5 V compared to 2.2 V) and exhibits higher specific capacitance under relatively low current densities. The $Et_4NBF_4$/PC electrolytes therefore have practical applications for commercialization considering the higher cost of WiS electrolytes remain.

Figure 3H:
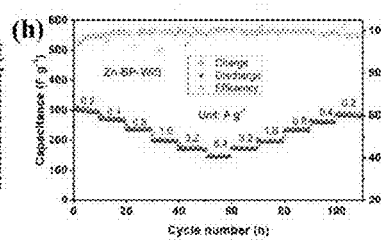
Figure 3I:
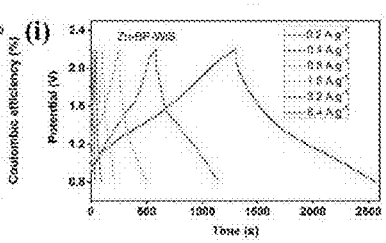

The comparison of the voltage range of capacitors in different electrolyte environments is shown in FIG. 3h, in which it is shown that most of the voltage ceilings in acidic, alkaline and even organic electrolytes were in the range from 1.0 to 1.5 V, and the voltage windows of many other aqueous ion capacitors such as aqueous lithium ion and sodium ion capacitor reaches 2.0 V. In the present invention, the upper limits of voltage ranges have been enhanced to 2.2 and 2.5 V in 'WiS' and $Et_4NBF_4$/PC electrolyte, respectively. Besides, both Zn-BP-WiS and Zn-BP-PC exhibited excellent cycling stability (more than 5000 and 9500 cycles) and outstanding faraday capacitances (304 and 363.9 $Fg^{-1}$ at 0.5 $Ag^{-1}$). As shown in FIG. 3i, the energy density and power density of Zn-BP-WiS can reach to 204.4 $Whkg^{-1}$ and 18 787.7 $Wkg^{-1}$, respectively, while the energy density and power density of Zn-BP-PC can reach to 315.6 $Whkg^{-1}$ and 23 582.4 $Wkg^{-1}$, respectively, (based on the mass of FL-P), which is much larger than that of other zinc ion capacitors and supercapacitors.

The FL-P-based zinc ion capacitors of the present invention exhibited the highest voltage ranges as well as superior specific capacitance, possessing both high-output voltage and excellent energy density, which have long been the two important limitations of capacitors.

In practical applications, self-discharge rate is one of the most important indices that have been neglected over the long term. We elaborately explored the anti-self-discharge properties of Zn-BP-WiS, BP-BP-WiS, Zn-BP-PC and BP-BP-PC. After ten cycles at 0.5 $Ag^{-1}$, the capacitors were charged to certain potentials, and then the retained capacitances were tested after a long period of rest. The ratio of the retained capacitance to the capacitance that is supposed to be delivered without the rest period is referred to as capacity retention, which can be used to evaluate anti-self-discharge performance. FIG. 4a displays the self-discharge curves of Zn-BP-WiS and BP-BP-WiS, from which a trend of sharp decline followed by flattening out can be clearly observed. The potential of Zn-BPWiS started to fall off quickly from 2.2 V to 1.6 V within 15 h, followed by a moderate self-discharge process that resulted in a retained potential of 1.47 V even after 300 h, and the corresponding capacity retention was calculated as 76.16% according to the continued discharge curve. BP-BP-WiS was also charged to 2.2 V, while the potential decreased to 1.2 V only after 2.8 h, and remained at 0.96 V after 200 h. The matching capacitance retention was only 12.12%.

Compared to BP-BP-WiS, the Zn-BP-WiS of the present invention showed significantly improved anti-self-discharge property, since the introduction of the conversion-type zinc anode causes the ions adsorbed on the FL-P anode to become more difficult to self-diffuse. There is a slight possibility of converting zinc to zinc ion spontaneously in the open circuit state, and its kinetic speed is much slower than the self-diffusion of the adsorptive ion. Hence, the ions were firmly adsorbed on the cathode materials and were difficult to diffuse into the electrolyte without the formation of an electronic circuit, which greatly improved the anti-self-discharge property of the zinc ion capacitor. The Zn-BP-PC and Zn-BP-WiS were charged to 2.5 V and their self-discharge curves are shown in FIG. 4b, which demonstrated that after 500 h self-discharge behavior, the capacity retention of Zn-BP-PC and Zn-BP-WiS remained at 70.16% and 72.4%, respectively. Though the voltage drop associated with Zn-BP-WiS was larger than that associated with Zn-BP-PC (the initial discharge potentials of Zn-BP-WiS and Zn-BP-PC were 2.5 and 2.3, respectively, FIG. 4b), the potential of both Zn-BP-WiS and Zn-BP-PC after 500 h self-discharge remained at 1.40 V, which means that Zn-BP-WiS possesses better anti-self-discharge property due to the high concentration of salt that can inhibit the diffusion of ions to some extent. The discharge curves after the self-discharge test period of these four systems (tested after FIGS. 4a and 4b) are exhibited in FIG. 4c, in which Zn-BP-WiS, Zn-BP-WiS-2.5 V, and Zn-BP-PC showed similar discharge curves, while the retained capacitance of BP-BP-WiS was much lower.

The capacitance retention after self-discharge test of different supercapacitors and ion hybrid capacitor systems were compared in FIG. 4d. The initial discharge voltage of most of the other capacitors was lower than 1.6 V and their self-discharge time was lower than 80 h. In contrast, the Zn-BP-WiS and Zn-BP-PC work demonstrate superiority in both anti-self-discharge time and initial discharge voltage. The Zn-BP-WiS delivered slightly higher capacitance retention than Zn-BP-WiS-2.5 V and Zn-BP-PC, and significantly higher capacitance than BP-BP-WiS, which demonstrates that the introduction of the zinc anode can effectively improve the anti-self-discharge properties.

Figure 9:
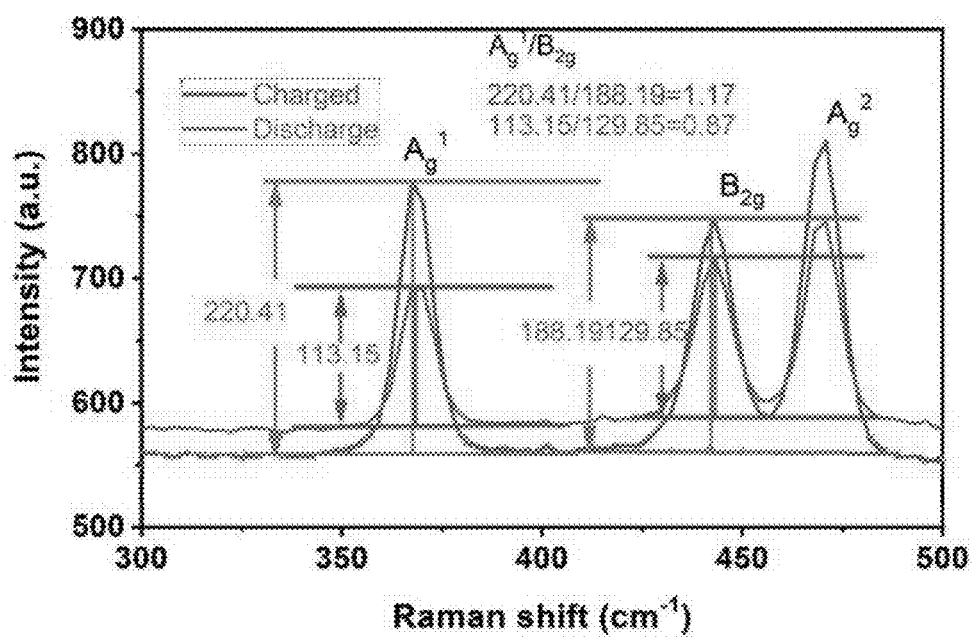
FIG. 9 is the Raman spectrum of FL-P in Zn-BP-WiS in charged and discharged state.

The charge and discharge behavior of Zn-BP-WiS was studied through Raman spectrum and Raman mapping. Typically, the Raman spectrum of FL-P exhibited three characteristic peaks: $Ag^1$, $B_{2g}$ and $Ag^2$. $Ag^1$ and $Ag^2$ modes involve the coupling of molecular vibrations in and out of the plane. $Ag^1$ mode has a large component in the direction of the armchair outside the plane, while $Ag^2$ mode has a large component in the direction of the armchair inside the plane, and $B_{2g}$ mode moves along the serrated direction inside the plane. The Raman spectra of Zn-BP-WiS in the charged and discharged states are shown in FIG. 9, in which no obvious Raman shift was observed. The ratio of $Ag^1/B_{2g}$ corresponds to the peak intensity value ratio of $Ag^1$ and $B_{2g}$. Specifically, the $Ag^1/B_{2g}$ ratio of the charged state, of value 1.17, was calculated by 220.41/188.19, and the $Ag^1/B_{2g}$ ratio of discharged state value 0.87 was calculated by 113.15/129.85. There was apparent difference in the $Ag^1/B_{2g}$ ratio in charged and discharged states, which decreased from 1.042 to 0.967 during the discharge process. To demonstrate the universality of this change, Raman mapping after the charging and discharging processes was conducted and is shown in FIGS. 4c to 4f. The green and blue colors represent the signal of $Ag^1$ and $B_{2g}$ modes, respectively. The Zn-BP-WiS in the charged state showed $Ag^1$ and $B_{2g}$ modes in similar intensity (FIGS. 4e, 4f), while the discharged state (FIGS. 4g, 4h) exhibits much weaker signal of $Ag^1$ and a slightly stronger signal of $B_{2g}$, indicating a noticeable decreased in the ratio of $Ag^1/B_{2g}$, which is in accordance with the Raman spectrum in FIG. 9. The decrease of the $Ag^1B_{2g}$ ratio means the decline of molecular vibrations outside the plane, which may be attributed to the adsorption of cations such as zinc ions and lithium ions on the surface and interlayer of FL-P.

Figures 4E, 4F, 4G, 4H:
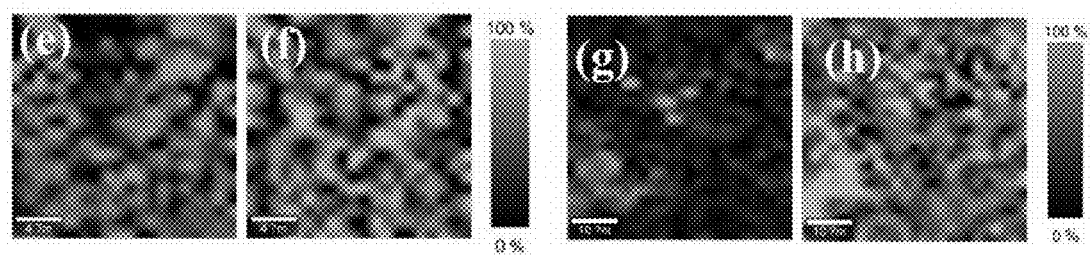
Figures 4I, 4L:
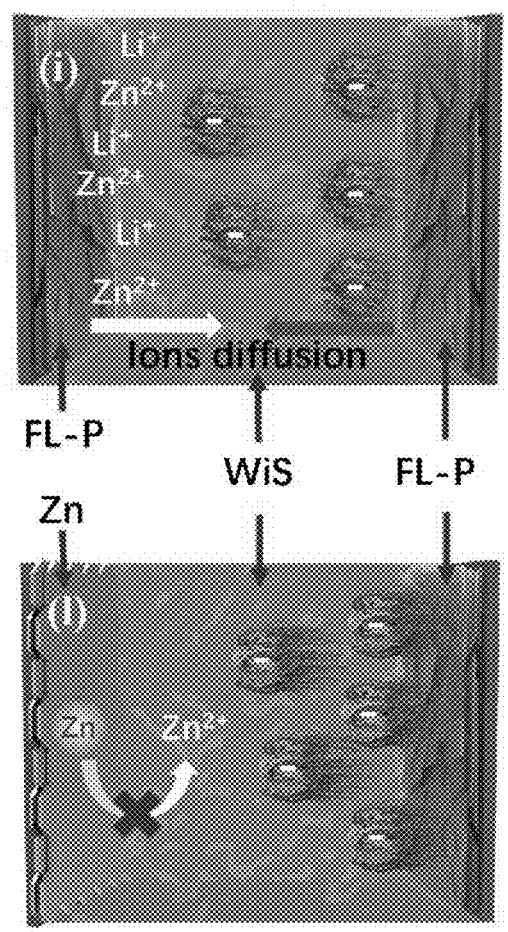
Figure 10A:
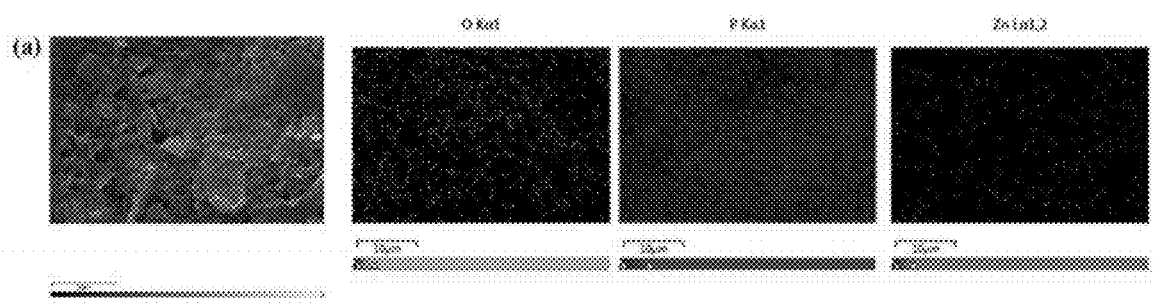
FIG. 10a-10b is an SEM and corresponding mapping images of FL-P anode after charge (a) and discharge process (b).
Figure 10B:
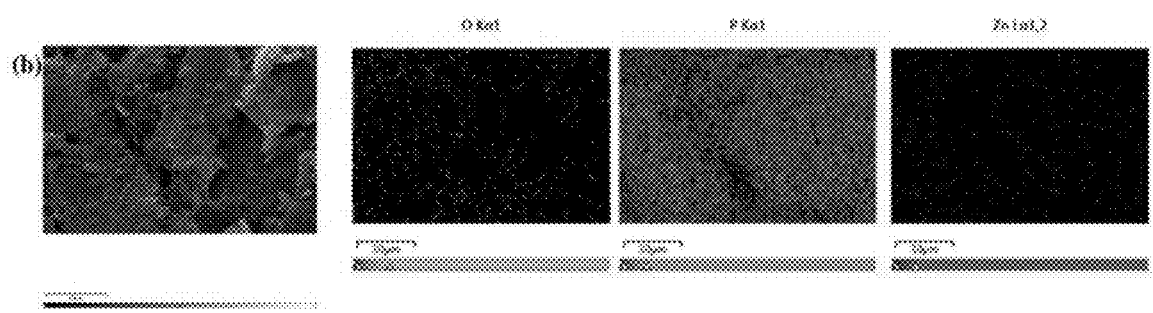
Figure 11A:
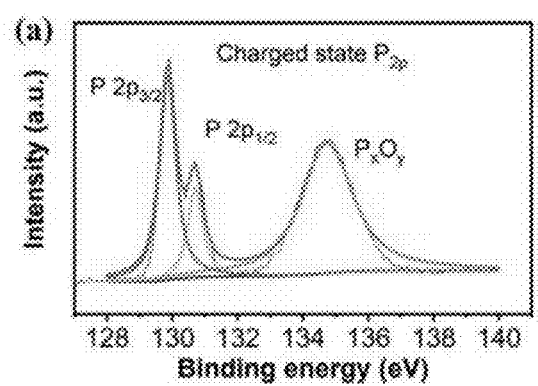
FIGS. 11a-11b are the P2p spectrum of FL-P in (a) charged and (b) discharged state.
Figure 11B:
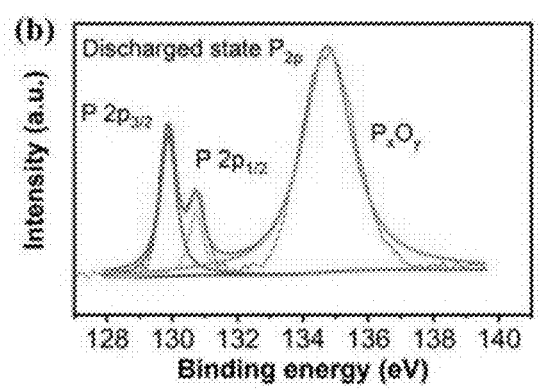

The SEM and corresponding mapping images of FL-P anode after the charging and discharging processes are displayed in FIG. 10, from which no obvious change in morphology and structure of FL-P can be noticed. The XPS measurements of FL-P in the charged and discharged states have been conducted as shown in FIG. 11. The P 2p spectrum of FL-P in the charged and discharged state showed almost unchanged P $2p_{3/2}$ and P 2 $p_{1/2}$ located at 129.87 and 130.70 eV, respectively. The broad peaks located at around 134.75 eV corresponded to the surface oxidation of FL-P ($P_xO_y$). The differences of $P_xO_y$ between the charged state and the discharged state may be attributed to different degrees of surface oxidation. The schematic diagrams of Fl-P based symmetrical supercapacitor and zinc ion capacitor in the charged state are displayed in FIGS. 4i, 4l. FL-P was used for both the anode and cathode materials in the symmetrical supercapacitor as shown in FIG. 4h, which stores energy through adsorption and pseudocapacitance behaviors.

In the state of complete charge, anions are adsorbed on the surface of the cathode material. For the anode material, cations including zinc ions and lithium ions are adsorbed in the symmetric supercapacitor. The ions adsorbed on the surface of electrode material tend to diffuse autonomously into the electrolyte in open circuit conditions due to concentration and voltage differences between the electrode and the electrolyte. Therefore, the FL-P-based symmetrical supercapacitor shows a higher self-discharge rate, which can also be understood as weaker adsorption between FL-P and ions in symmetrical system. As shown in FIG. 4g, the anode and cathode materials of the zinc ion capacitor were zinc metal and FL-P. During the charging and discharging process, the conversion between Zn and $Zn^{2+}$ occurred at the anode, while adsorption and pseudocapacitance reactions occurred on the surface of FL-P at the cathode.

In the charged state, there is no cation concentration difference in the negative electrode of zinc ion hybrid capacitor, and the possibility of spontaneous conversion of zinc to zinc ions in the open circuit state is low. The kinetic speed of zinc ion is also slower than the self-diffusion of adsorptive ion, so the zinc ion capacitor shows excellent anti-self-discharge performance. The miniaturization and flexibility of energy storage devices is a demand associated with the development of portable electronic devices.

To demonstrate the feasibility of FL-P-based zinc ion capacitors, we assembled a flexible paper-based printed micro capacitor. A schematic diagram of the screen printing process is illustrated in FIG. 5, which shows the four steps of the printing and assembly process:

1. Printing a conductive carbon substrate on a paper-based current collector;
2. Printing cathode materials on half of the substrate patterns;
3. Printing anode materials on another half of the substrate patterns;
4. Covering the pattern with a hydrogel soaked in electrolyte.

Figure 5A:
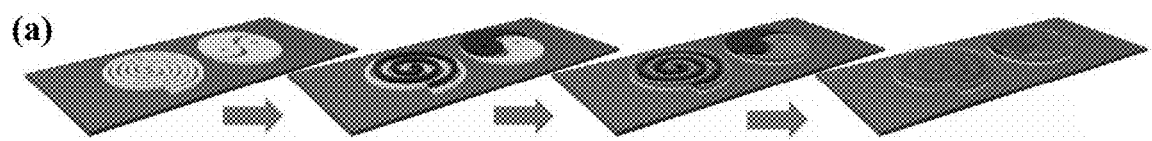
FIG. 5a-5f show printed capacitors and their manufacture.
Figure 5B:
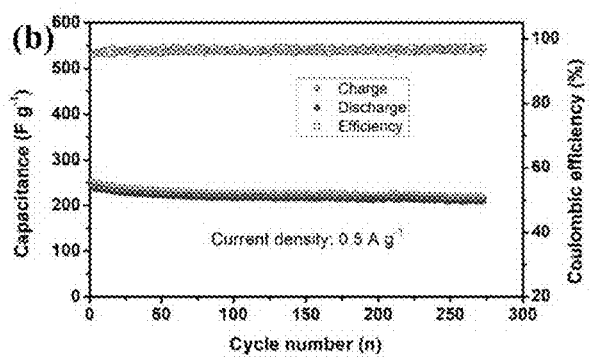
Figure 5C:
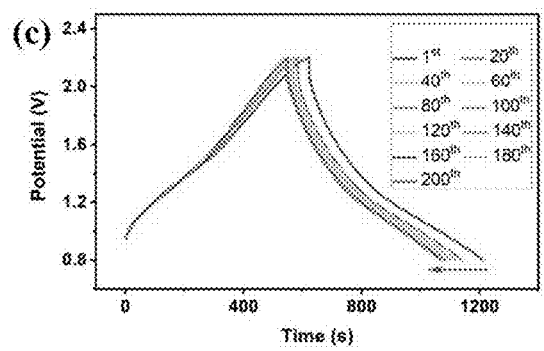
Figure 5D:
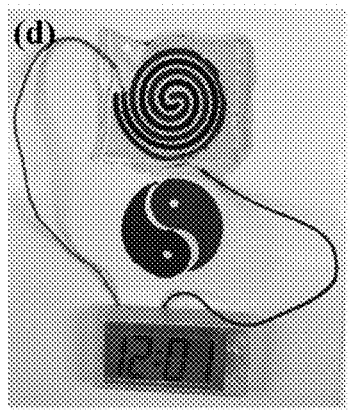
Figure 5E:
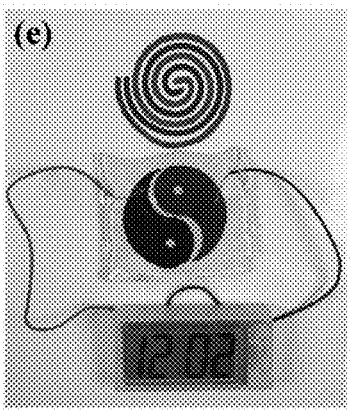
Figure 5F:
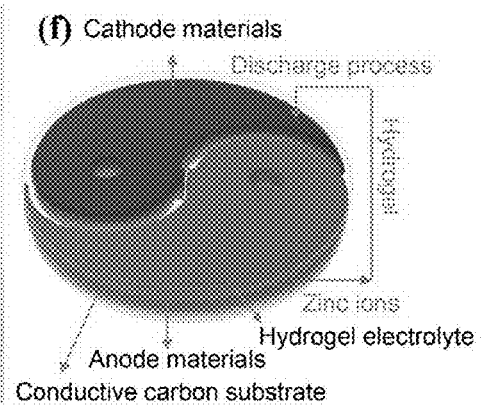
Figure 12A:
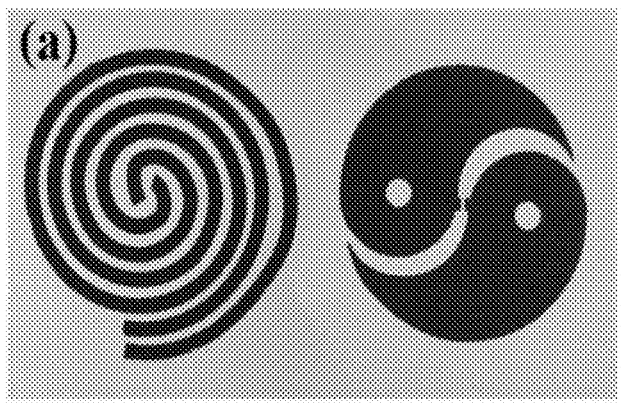
FIGS. 12a-12c are printed substrates and electrodes.
Figure 12B:
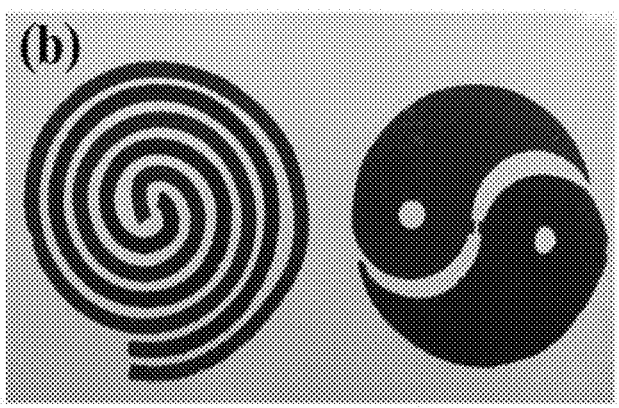
Figure 12C:
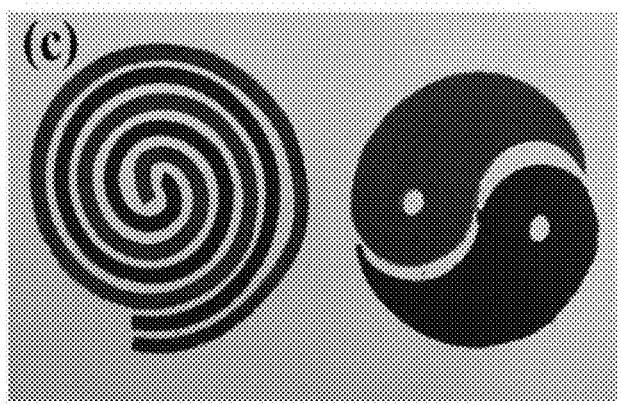

Following the above process, the conductive carbon substrate was printed in spiral and tai-chi patterns on a paper-based current collector (FIG. 12a), printed FL-P materials on the inner circle of the spiral design and the lower part of the tai-chi design (FIG. 12b) and printed zinc powder materials on the other part of spiral and tai-chi patterns (FIG. 12c). Finally, the polyacrylamide (PAM) hydrogel soaked in electrolyte was put on the patterns. The electrochemical performance of paper-based zinc ion capacitor with FL-P and PAM serving as the cathode and polyelectrolyte (Zn-BP-PAM) is shown in FIGS. 5b and 5c. Zn-BP-PAM delivered 216.8 F $g^{-1}$ after 275 cycles at a current density of 0.5 A $g^{-1}$. Their GCD curves are shown in FIG. 5c, in which GCD curves in different cycles almost overlap with each other, indicating decent cycling stability of the Zn-BP-PAM. Spiral (FIG. 5d) and tai-chi patterns (FIG. 5e) were prepared through the screen printing method and both were utilized for the power supply of an electronic watch. The structure and the ion pathway of the tai-chi pattern are enlarged in FIG. 5f.

During the discharge process, zinc ions diffused from the anode pattern through the hydrogel to the cathode pattern, while the charging process was reversed.

INDUSTRIAL APPLICABILITY

A high operating voltage, anti-self-discharge, FL-P-based zinc ion capacitor is presented that can be easily manufactured at a low price for commercial use. The FL-P was prepared through an electrochemical exfoliation method. '$Et_4NBF_4$/PC electrolytes with zinc was adopted to expand the potential range of the zinc ion capacitor. The introduction of a conversion-type zinc anode significantly improved the energy density and anti-self-discharge performance of the capacitor. The operating voltage of zinc ion capacitor utilizing 'WiS' electrolyte reached 2.2 V; it delivered 214.3 $Fg^{-1}$ after 5000 cycles and retained a capacitance of 145.9 $Fg^{-1}$ even at an ultrahigh current density of 6.4 $Ag^{-1}$. The operating voltage of the zinc ion capacitor with $Et_4NBF_4$/PC solvent as an electrolyte reached 2.5 V, exhibiting 105.9 Fg-1 after over 9500 cycles. More importantly, the FL-P-based capacitor exhibited excellent anti-self-discharge performance; it retained 76.16% of capacitance after a rest period of 300 h.

The practical application of zinc ion capacitor has been demonstrated using a flexible paper-based printed microcapacitor. It can be printed into a variety of patterns and is at the same time characterized by paper-flexibility and can be used as a power source for electronic watches. The invention demonstrates that ion hybrid capacitors are an effective technology for improving anti-self-discharge properties and can facilitate the enhancement of capacitors to high output voltage, providing more promising application scenarios for zinc ion capacitors due to their expanded potential range.

The energy density and power density of FL-P-based zinc ion capacitor can be further calculated from GCD curves at different current density utilizing following equations: Where E (Wh $kg^{-1}$) is the energy density of the capacitor, P (W $kg^{-1}$) is the power density of the capacitor, and t (s) is the discharge time of the GCD curves. The invention expands the operating potential window of supercapacitor, the resultant Zn-BP-PC delivers a high initial discharge voltage of 2.5 V. The introduction of conversion-type zinc anode improves the energy density of a supercapacitor. The Zn-BP-PC exhibits excellent anti-self-discharge ability, which can be ascribed to a zinc anode that will not spontaneously transform to zinc ion, effectively inhibiting the autonomous diffusion of ions in the open circuit state. This Zn-BP-PC with a high output voltage and excellent anti-self-discharge ability has great prospects in solar street energy storage system, port machinery, quick charging device, energy recovery of rail transit, high-power motor startup, consumer electronics and other fields.

The Zn-BP-PC has a higher output voltage than aqueous supercapacitors. The Zn-BP-PC possesses a greater energy density than prior art supercapacitors and higher power density than zinc ion batteries. The Zn-BP-PC possesses a greater anti-self-discharge capacity than other supercapacitors.

It should be apparent to those skilled in the art that many modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes", "including", "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A supercapacitor comprising:
a cathode including a plurality of layers of phosphorene;
an anode comprising zinc;
an insulating separator; and
an organic-solvent-based electrolyte including zinc.

2. The supercapacitor as recited in claim 1, wherein the organic-solvent-based electrolyte includes propylene carbonate and tetraethylammonium tetrafluoroborate.

3. The supercapacitor as recited in claim 2, wherein the organic-solvent-based electrolyte comprises a concentration of 0.1 M to 1 M of tetraethylammonium tetrafluoroborate.

4. The supercapacitor as recited in claim 1, wherein the zinc is present in the form of an anhydrous zinc salt.

5. The supercapacitor as recited in claim 4 wherein the anhydrous zinc salt is selected from the group consisting of zinc chloride, zinc trifluoromethylsulfonate, zinc di[bis(trifluoromethylsulfonyl)imide].

6. The supercapacitor as recited in claim 4, wherein the organic-solvent-based electrolyte comprises a concentration of 0.1 M to 2 M of the anhydrous zinc salt.

7. The supercapacitor as recited in claim 1, wherein the phosphorene is few-layer phosphorene from electrochemical cathodic exfoliation of black phosphorus.

8. The supercapacitor as recited in claim 1, wherein the anode comprises a zinc sheet or a layer of zinc metal deposited on a current collector.

9. The supercapacitor as recited in claim 1, wherein the cathode comprises a plurality of layers of phosphorene deposited on a current collector.

10. The supercapacitor as recited in claim 9 further comprising a plurality of electronic conductive particles and/or a binder material.

11. A supercapacitor electrolyte comprising:
an organic solvent including propylene carbonate and tetraethylammonium tetrafluoroborate, wherein the tetraethylammonium tetrafluoroborate is present in a concentration of 0.1 M to 1 M;
an anhydrous zinc salt;
wherein the organic solvent provides a polar environment configure to dissolve the anhydrous zinc salt.

* * * * *